Oct. 7, 1969  KIYOAKI SESE  3,471,259
METHOD OF MANUFACTURING A MAGNESIA CLINKER
Filed Jan. 30, 1967
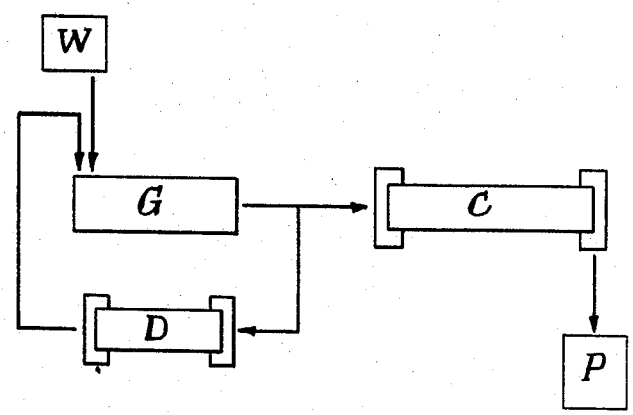
INVENTOR.
KIYOAKI SESE
BY
Bailey, Stephens & Huettig
ATTORNEYS United States Patent Office 3,471,259
Patented Oct. 7, 1969

3,471,259
METHOD OF MANUFACTURING A
MAGNESIA CLINKER
Kiyoaki Sese, Tokyo, Japan, assignor to Asahi Glass Co.,
Ltd., Tokyo, Japan
Filed Jan. 30, 1967, Ser. No. 612,518
Int. Cl. C01f 5/02
U.S. Cl. 23—201                           2 Claims

ABSTRACT OF THE DISCLOSURE

Precipitated wet magnesium hydroxide is mixed with dry magnesium hydroxide in an agglomerating-mixer. A portion of the magnesium hydroxide granules formed, at least 85 wt. percent of which have a particle size within the range of 1 to 20 mm., is calcined at a temperature above 1550° C. The rest of formed magnesium hydroxide is dried and recycled to the mixing process.

BACKGROUND OF THE INVENTION

Field of the invention

This invention relates to a method for the manufacture of a magnesia clinker. More particularly, it relates to a method of manufacturing a granular magnesia clinker having a high apparent specific gravity in an effective manner from magnesium hydroxide precipitated from a magnesium salt-containing solution such as sea water.

Description of the prior art

Magnesia clinker or dead-burned magnesia has hitherto been used widely as a raw material for magnesia refractories, tamping material for steel making furnaces and the like. In recent years, in particular, there have been increased demands for a granular magnesia clinker having high apparent specific gravity. However, conventional processes heretofore used for producing a magnesia clinker from precipitated magnesium hydroxide could not meet such a requirement. It has been found that in the case of producing a magnesia clinker directly from wet precipitated magnesium hydroxide, for example, by calcining or burning in a long rotary kiln, the magnesium hydroxide supplied is pulverized by drying and dehydration in the first half of the kiln and the powders are bonded together in the latter half thereof. In this process a magnesia clinker is obtained which has a low apparent specific gravity, and moreover, the proportion of powdered magnesia below 1 mm. in particle size amounts to the order of 35 to 40 wt. percent and becomes more than 50 wt. percent in some cases. Furthermore, this process involves disadvantages in that charging of the raw material into the rotary kiln is difficult and scaling is apt to occur at the charging side of the kiln.

The above-described disadvantages cannot be avoided even though wet magnesium hydroxide is introduced into a long rotary kiln after previous drying. When magnesium hydroxide which has been granulated in the presence of a suitable amount of water and has a particle size of 15 to 50 mm. is calcined, very little powdered magnesium hydroxide is produced during calcining, but the resulting magnesia clinker is pulverized to a considerable extent during size-reduction to a particle size suitable for use. Moreover, such granulation of dry magnesium hydroxide or magnesium oxide not only requires a granulator but also complicated operations.

BRIEF SUMMARY OF THE INVENTION

It is an object of this invention to provide a method of manufacturing a granular magnesia clinker having a desired particle size distribution from precipitated magnesium hydroxide with a high yield without press-forming.

Another object of the invention is to provide a method of manufacturing a granular magnesia clinker having a high apparent specific gravity.

A further object of the invention to provide a method of manufacturing a granular magnesia clinker having a particle size of from 1 mm. to 10 mm. with a high yield while keeping the proportion of powdered magnesia clinker as little as possible.

These objects and other objects can be accomplished by a novel method which comprises the following steps of:

Mixing wet magnesium hydroxide and dry magnesium hydroxide and subjecting the resulting mixture to granulation by agglomeration;

Calcining a part of the granulated magnesium hydroxide at least 85 wt. percent of which has a particle size within the range of from 1 mm. to 20 mm. to produce a magnesia clinker; and Drying the other part of the granulated magnesium hydroxide, and recycling it to the mixing.

BRIEF DESCRIPTION OF THE DRAWING

In order that the invention may more readily be understood, reference is now made by way of example to the accompanying drawing wherein the figure shows a flow-sheet of the method according to this invention.

Referring to the accompanying drawing, the squares lettered W and P, respectively, represent wet magnesium hydroxide as a raw material and magnesia clinker, which is the final product and the rectangles lettered G, C and D, respectively, represent a mixer, calciner or burner and dryer.

DETAILED DESCRIPTION

In the figure, magnesium hydroxide W is produced by various procedures, for example, by adding calcium hydroxide to a magnesium salt-containing solution such as sea water. The calcium hydroxide may be used in the form of an aqueous suspension or solution, or also in the form of a mixture with other components such as dolomite, if required. In the case where it is desired to produce a magnesia clinker with low calcium content, a calcium hydroxide and magnesium salt-containing solution having a low $CO_2$ content should be used. Precipitated magnesium hydroxide, after thickening, if necessary, is, for instance, separated by filtering whereby wet magnesium hydroxide is obtained which contains 40 to 65% by weight of free water.

The wet magnesium hydroxide W is then mixed with dry magnesium hydroxide as set forth in detail hereinafter and if desired, with a mineralizing agent. The mineralizing agent may be added or precipitated at the same time as or after the formation of the magnesium hydroxide. The adsorptive property of magnesium hydroxide provides for agglomeration at the same time as the mixing. Granules obtained by the agglomeration possess a particle size and strength suitable for the production of a magnesia clinker by calcining and are substantially free from powdering in the course of the calcining. A type of mixer capable of mixing and granulating simultaneously, for example, a pug mixer, double cone mixer or ribbon mixer can be used as mixer G. The thus-obtained magnesium hydroxide of 1 mm. to 20 mm. in particle size gives a magnesia clinker of a preferred range of 1 mm. to 10 mm. in particle size upon calcining. Furthermore, a small amount of powdered magnesium hydroxide adhering to the magnesium hydroxide granules is incorporated into the magnesia clinker granules in the calcining step. Consequently, calcining of the magnesium hydroxide granules, at least 85 wt. percent of which have a particle size within the range of 1 mm. to 20 mm. results in a substantially powder-free magnesia clinker having a desirable particle size distribution as a product P. In general, the high proportion of magnesium hydroxide granules below 1 mm. in particle size increases the proportion of undesirable powdered product, while the high proportion of magnesium hydroxide granules over 20 mm. in particle size increases the proportion of oversized product requiring a pulverizing step.

The magnesium hydroxide granules are calcined or dead burned to give a magnesia clinker which is the final product. The granules may be dried prior to the calcining or burning. The calcining C is accomplished in a suitable calcining furnance such as a rotary kiln at a temperature higher than 1550° C. at which the growth of periclase crystals is made possible. The calcining furnance can be operated continuously for a long time without scaling. The product of this invention has an apparent specific gravity or density of 3.2 to 3.3 and the quantity of powder having a particle size below 1 mm. contained therein is of the order of several percent. It is applicable to various uses.

It has been found that the proportion of free water content has no influence upon the particle size of a product so far as the forming is possible, when press- formed magnesium hydroxide is calcined in accordance with a conventional known process; while when magnesium hydroxide granules obtained by mixing wet magnesium hydroxide and dry magnesium hydroxide are calcined in accordance with the invention, the free water content in the mixture has a close connection with the particle size of a product. It is further preferred that relation between the free water content in the mixture (Y% by weight) and the free water content in the wet magnesium hydroxide (X% by weight) satisfies the following equation:

$$Y = (42 \text{ to } 50) - \frac{5}{12} \cdot X$$

In this equation, X and Y are selected as follows, for example, when X=48, Y=22 to 30, and when X=60, Y=17 to 25. If the free water content in the mixture is more than the range given by the above equation, the formation of relatively large granules is accelerated during the mixing, whereas if less, the formation of relatively minute granules is accelerated. In any case, consequently, it becomes difficult to obtain a magnesia clinker having a desired particle size upon calcining.

Therefore, dry magnesium hydroxide should be used for the purpose of providing magnesium hydroxide granules having a particle size suitable for calcining as well as a free water content suitable for calcining. To this end, the free water content of the dry magnesium hydroxide is to be less than 15% by weight, preferably less than 7% by weight. Such dry magnesium hydroxide is produced by drying a part of the granulated magnesium hydroxide not subjected to calcining, or by drying all the granulated magnesium hydroxide. In the latter case, only a part of the dried magnesium hydroxide, having a desired particle size, is subjected to calcining and the other part is recycled to the mixing.

The drying step D is accomplished at a temperature of 70° C. to 250° C., preferably 110° C. to 150° C. by means of a suitable drier, in which case the waste gas from a calcining furnace is preferably used. The proportion of magnesium hydroxide to be dried is so selected that a mixture having a desired free water content may be obtained continuously, according to the free water content of wet magnesium hydroxide. Such cyclic system is remarkably advantageous in that the oversized and undersized material obtained in the mixing-agglomerating step are effectively utilized.

This invention is further described in the following examples which are illustrative but not limitative thereof.

Example 1

A slurry of magnesium hydroxide (MgO: 120 to 150 g./l.) was produced by reacting milk of lime with previously dicarboxylated sea water and filtered by means of an Oliver filter to give a filter cake of wet magnesium hydroxide containing approximately 50% by weight of free water. 1 part by weight of the so obtained wet magnesium hydroxide and 1.2 parts of a dry magnesium hydroxide containing about 5% by weight of free water were continuously charged into a ribbon mixer, where thye were mixed and granulated in a resident time of 10 to 20 minutes. 2.2 parts by weight of a mixture was continuously obtained having about 25% by weight of free water and the following particle size distribution:

| | Wt. percent |
|---|---|
| More than 20 mm. | 5 |
| 20 to 10 mm. | 18 |
| 10 to 1 mm. | 65 |
| Less than 1 mm. | 12 |

0.73 part of the granulated magnesium hydroxide from which the granules over 20 mm. and below 1 mm. had been removed was continuously introduced into one end of a rotary kiln, in which it was countercurrently brought into contact with a combustion gas of a heavy oil burner provided at the other end, and calcined. The time required for the calcining was 260 to 300 minutes and the calcining temperature reached 1,800° C. to 1,850° C. 0.3 part of a magnesia clinker was obtained having an apparent specific gravity of 3.2 to 3.3 and the following particle size distribution:

| | Wt. percent |
|---|---|
| More than 10 mm. | 5 |
| 10 to 8 mm. | 8 |
| 8 to 4 mm. | 39 |
| 4 to 1 mm. | 43 |
| Less than 1 mm. | 5 |

On the other hand, 1.47 parts by weight of the magnesium hydroxide containing about 25% by weight of free water that had not been introduced into the rotary kiln was fed into a rotary drier wherein it was further brought into contact with a waste gas from the rotary kiln. Dry magnesium hydroxide containing about 5% by weight of free water was obtained and reused for the mixing-agglomerating step. The time required for the drying was about 60 minutes and the maximum temperature reached about 150° C.

Example 2

The amount of the dry magnesium hydroxide charged to the ribbon mixer in Example 1 was reduced to 0.8 part by weight, and thus, granular magnesium hydroxide containing about 30% by weight of free water was obtained, but the mixing was difficult and troublesome because of excessive free water content. The granular magnesium hydroxide from the granules above 20 mm. and below 1 mm. had been removed was introduced into a rotary kiln and calcined under the same condition as that in Example 1. The proportion of granules larger than 10 mm. in the resulting magnesia clinker reached about 20 wt. percent The amount of the dry magnesium hydroxide charged to the ribbon mixer in Example 1 was increased to 2.75 parts by weight, and thus, granular magnesium hydroxide having about 17% by weight of free water content was obtained. The granular magnesium hydroxide from the granules above 20 mm. and below 1 mm. had been removed was introduced into a rotary kiln and calcined under the same condition as in Example 1. The proportion of granules smaller than 1 mm. in the resulting magnesia clinker reached about 10 wt. percent. In this example the drying was difficult and troublesome because of a large proportion of powder.

I claim:

1. A method of manufacturing a granular magnesia clinker from precipitated wet magnesium hydroxide obtained by reaction of calcium hydroxide with a magnesium salt containing solution, which comprises mixing the wet magnesium hydroxide containing 40 to 65% by weight of free water and dry magnesium hydroxide containing less than 15% by weight of free water in an agglomerating-mixer to cause simultaneous mixing and granulation by agglomeration, the mixing proportion of the wet magnesium hydroxide and dry magnesium hydroxide being so selected that tthe free water content in the mixture (Y% by weight) and the free water content in the wet magnesium hydroxide (X% by weight) satisfies the equation:

$$Y = (42 \text{ to } 50) - \frac{5}{12} X$$

calcining a part of the granules of the thus granulated magnesium hydroxide obtained in the simultaneous mixing and granulating operation in which part at least 85% by weight is of a particle size within the range of 1 mm. to 20 mm. to produce a granular magnesia clinker, drying the other part of the granulated magnesium hydroxide at a temperature of 70° C. to 250° C. to produce dry magnesium hydroxide containing less than 15% by weight of free water; and recycling the thus resulting dry magnesium hydroxide to the mixing operation.

2. The method of claim 1 in which tthe mixing proportion of the wet magnesium hydroxide and the dry magnesium hydroxide is such that the free water content of the mixture is between 17 and 30 wt. percent.

References Cited

UNITED STATES PATENTS 2,348,847  5/1944  Pike _____ 23—201

OTHER REFERENCES

Perry, Chemical Engineers' Handbook, 3rd ed., McGraw-Hill Book Co., New York, 1950, pp. 1209, 1210 and 1212.

Mellor, Comprehensive Treatise on Inorganic and Theoretical Chemistry, vol. 4, p. 291.

OSCAR R. VERTIZ, Primary Examiner

G. T. OZAKI, Assistant Examiner